United States Patent [19]

Löbbert

[11] Patent Number: 5,058,218

[45] Date of Patent: Oct. 22, 1991

[54] WATERLESS TOILET

[76] Inventor: Johannes Löbbert, Industriestrasse 1, 4405 Nottuln 2, Fed. Rep. of Germany

[21] Appl. No.: 628,077

[22] Filed: Dec. 13, 1990

[30] Foreign Application Priority Data

Dec. 14, 1989 [DE] Fed. Rep. of Germany ....... 3941304

[51] Int. Cl.$^5$ ..................... A47K 11/02; A47K 11/04; A47K 11/06
[52] U.S. Cl. .......................................... 4/479; 4/461; 4/467; 4/484
[58] Field of Search ................... 4/449, 460, 461, 474, 4/475, 476, 477, 479, 478, 484, 661, 467

[56] References Cited

U.S. PATENT DOCUMENTS

| 145,756 | 12/1873 | Russell et al. | 4/467 |
| 811,412 | 1/1906 | Koons | 4/461 |
| 2,116,253 | 5/1938 | Van Buren | 4/467 |

FOREIGN PATENT DOCUMENTS 2116220 9/1983 United Kingdom ..................... 4/461

Primary Examiner—Allan N. Shoap
Assistant Examiner—Diego F. F. Gutierrez
Attorney, Agent, or Firm—Sprung Horn Kramer & Woods

[57] ABSTRACT

A waterless toilet for use with containers that accommodate the waste and can be sealed tight. A seat has n depressions, each accommodating one container, whereby n is at least and preferably 4. The seat can be rotated at increments of 360/n° around a vertical axis so that the depressions assume in sequence: (1) a first position at which are disposed a magazine that accommodates a supply of unused containers and a mechanism for distributing the individual containers, (2) second position at which the toilet can be used, (3) a third position at which are disposed a magazine that accommodates a supply of lids for sealing the used containers and a mechanism for distributing the individual lids, and (4) a fourth position at which is disposed a robotic arm for removing each container, once a lid has been placed over the used container, extracting the closed container and forwarding it to a depot.

8 Claims, 7 Drawing Sheets

WATERLESS TOILET

BACKGROUND OF THE INVENTION

The invention concerns a waterless toilet for use with containers that accommodate the waste and can be sealed tight.

Waterless toilets are employed where the water lines and sewage pipes necessary for conventional toilets are not available. They are especially employed in intercity buses, on ships and boats, in aircraft, and for camping.

A waterless toilet of the aforesaid type is known from U.S. Pat. No. 3,772,712. The container is a rigid cardboard box or similar structure that accommodates a flexible bag and can be sealed. The bag extends out of the box, and its upper edge is stretched over the toilet seat. Once it has been used, the bag is collapsed by a vacuum generated by an appropriate device and the box is sealed.

The known waterless toilet demands a lot of effort on the part of the user to operate smoothly. The container must be inserted manually and connected to the vacuum line. The user must seal the box by hand once the bag has been collapsed and remove it from the toilet in order to get rid of it. When the toilet is employed in a public area there is no way to ensure that each user will carry out all the procedures necessary to leave the toilet in a proper state for the next user.

German Patent 468 100 discloses a waterless toilet with a seat and a vessel that can be sealed at the bottom with a flap. The vessel accommodates a sack of waterproof paper or a similar material. The drawback is that the sack must be extracted from the vessel by means of a hook on the lower flap that engages a cord on the bottom surface of the sack and dropped into an open container. The manipulations necessary to carry out this procedure are not appropriate for general use.

Another waterless toilet is known from German Patent 880 920. It has a container that accommodates a stack of lids for closing off the toilet bowl. Another device is employed to seal the used container with the lid. Also necessary, however, is a compression spring to force the lids up out of the container, and the lids must then be forced onto the container by a device that is manually operated and consists of many individual components.

Neither of these approaches can, due to their design and the drawbacks it entails, be employed for a user-friendly and hygienic toilet that involves individual receptacle bags or containers.

SUMMARY OF THE INVENTION

The object of the present invention is to eliminate the drawbacks of the prior art and to provide a waterless toilet that will ensure smooth operation with no need for the user to seal a used container, remove it, and insert a new one. The invention is intended to operate automatically by means of appropriate drive mechanisms and components and to provide each user with a ready-to-use and hygienic toilet.

This object, as well as other objects which will become apparent in the discussion that follows, are achieved, in accordance with the present invention in a waterless toilet of the aforesaid type, by providing a seat that can be rotated at increments of 360/n° around a vertical axis and which has n depressions, each accommodating one container, whereby n is at least and preferably 4. The depressions assume, in sequence, the following positions:

(1) A first position which is accessible to a magazine that accommodates a supply of unused containers and is equipped with a mechanism for dispensing the individual containers.
(2) A second position in which the toilet can be used.
(3) A third position which is accessible to a magazine that accommodates a supply of lids for sealing the used containers and is equipped with a mechanism for dispensing the individual lids.
(4) A fourth position in which the containers can be removed and which features a robotic arm that, once a lid has been placed over the used container, extracts the closed container and forwards it to a depot.

This system ensures automatic operation of the waterless toilet in accordance with the invention. The user's bare fingers or hands are not needed to execute any unpleasant and unhygienic operations. Maintenance is needed only occasionally to restock the magazines with containers and lids and empty the depot.

The principle behind the waterless toilet in accordance with the invention is to provide a rotating seat with preferably four depressions, each capable of supporting a container for waste. Each depression arrives, in sequence, due to the rotation of the seat, at a magazine that releases an empty container, at the utilization position, at a magazine that releases a lid for closing the used container, and at an extraction position, where a robotic arm removes the closed container and forwards it to a depot.

The containers are preferably plastic bags derived from a tube of thin plastic sheeting and having an edge in the form of a rigid collar projecting out of their open end. This design is particularly practical for use with the waterless toilet in accordance with the invention. The flexible plastic can be folded flat and takes up little space in the magazine. Since the bags can be collapsed to relatively small size, they will also occupy little space in the depot. The rigid edge of the bag facilitates handling the bags in the magazine and releasing them from it with an appropriate mechanism. The collar also facilitates securing the container in the depression in the seat and positioning the lid tight. The lid is advantageously constructed to surround the outer surface of the edge tightly. It is possible to provide the lid magazine with mechanisms that will force it tight against the edges of the container. It is, however, also possible for the user to initially apply the lid loosely while the system is in the lid-magazine position and for the robotic arm to force it down tightly when the system arrives at the next position before extracting the container and forwarding it to the depot.

The mechanism that releases the individual containers can preferably be a device capable of supporting the lowest container in the magazine in a securing position, shifting it into a release position, releasing it, and traveling back into the securing position. This mechanism is accordingly designed to release only one container at a time into a depression that has been emptied by the robotic arm while in the extraction position and aligned with the container magazine by the rotation of the seat.

To allow it to employ the aforesaid plastic containers with a projecting rigid edge, the waterless toilet in accordance with the invention preferably has a blower that inflates a container once it has been released lying flat from the magazine. The blower can be any mechanism that will generate a jet of gas or liquid for expanding the container for use. It can accordingly be a fan or a cylinder of compressed air or other gas that will blow the flattened container into shape.

The mechanism that releases the individual lids can preferably be a device capable of supporting the lowest container in the magazine in a securing position, shifting it into a release position, releasing it, and traveling back into the securing position. In principle, accordingly, the lid-release mechanism functions like the container-release mechanism. What is essential is that only one lid be released at a time and that the other lids be retained in the magazine.

Like that in the container-release mechanism, the support in the lid-release mechanism can comprise several pins or tongues that travel in and out and engage the bottom of the containers or lids being secured. It is also possible for the mechanisms to comprise round holders, themselves composed of two or more components that engage the bottom of the containers or lids being supported in the securing position, expand along their diameters as they travel out into the release position, and accordingly release the containers or lids.

The rotation of the seat and the functions of the remaining components can be initiated by the user once he or she is finished with the toilet by activating a switch or similar mechanism. Preferably, however, the waterless toilet in accordance with the invention is provided with a sensor that operates in conjunction with an electric circuit to automatically initiate a 360/n° rotation of the seat, the release of a fresh container and lid, and extraction of the used container by the robotic arm once the user has finished. Such a mechanism ensures operation of the toilet independent of any intervention on the part of the user.

The depressions are advantageously provided with a drain that opens into a tank when the toilet is in the ready-to-use position. This feature ensures proper operation even when a container is defective or when the supply runs out due to deficient maintenance.

To maximize exploitation of the depot for the used containers, the toilet is advantageously provided with a mechanism that compacts the material accumulated in the depot. The compactor, which can function like a garbage compactor or similar appliance, considerably reduces the volume of the deposited containers and accordingly contributes to economically and environmentally sound utilization of the toilet.

The preferred embodiment of the present invention will now be described with reference to the accompanying drawings.

BRIEF DESCRIPTION OF THE PREFERRED EMBODIMENT

Figure 1:
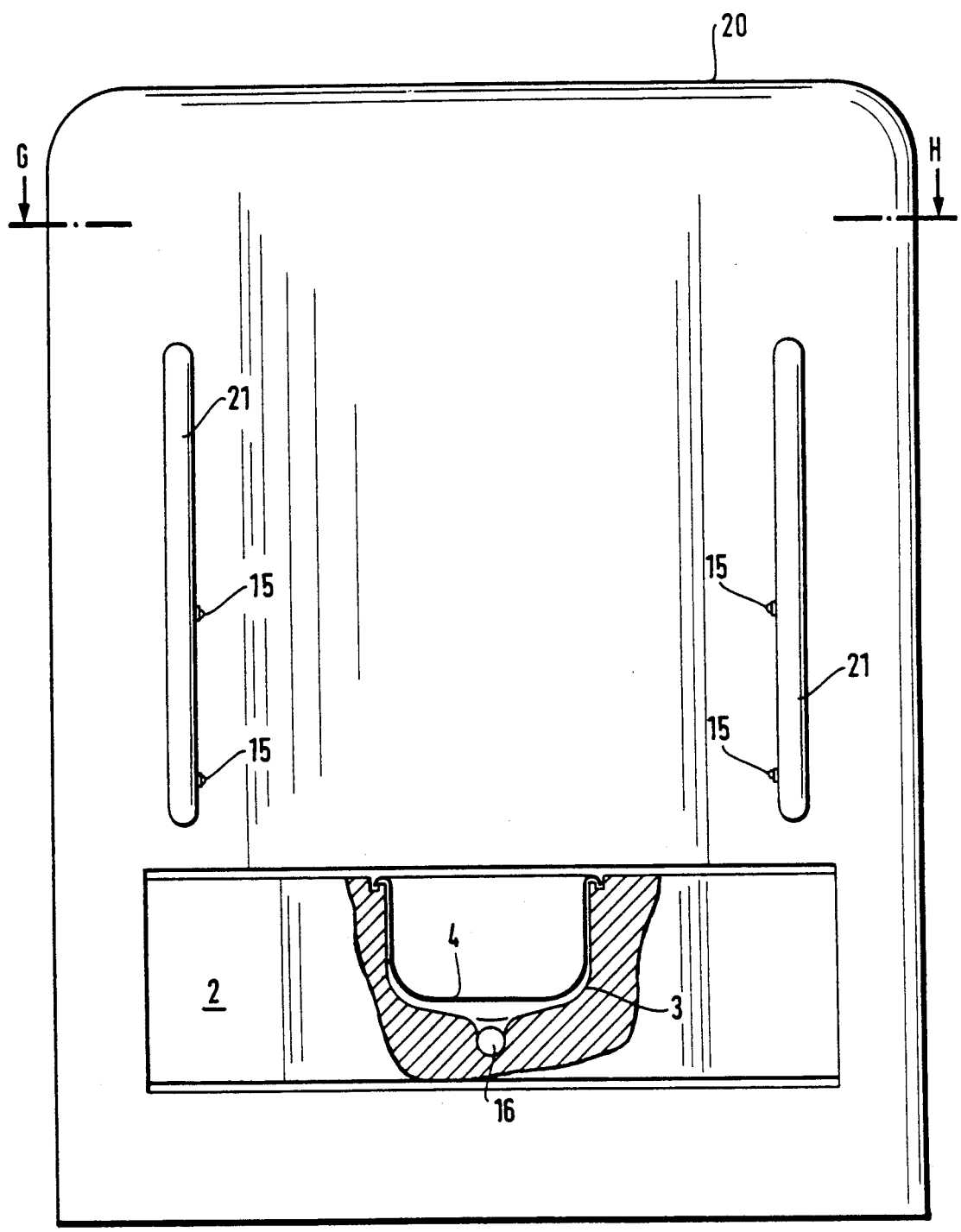
FIG. 1 is a partly sectional front view of a waterless toilet, in accordance with the preferred embodiment of the invention.

Inside the booth 20 illustrated in FIG. 1 is a rotating seat 2 with depressions 3 that accommodate containers 4. The seat rotates around a vertical axis. The rotation and other functions of the waterless toilet are automatically initiated by light beam sources and sensors 15 mounted on partitions 21, and connected to an electrical circuit (not shown).

Figure 2:
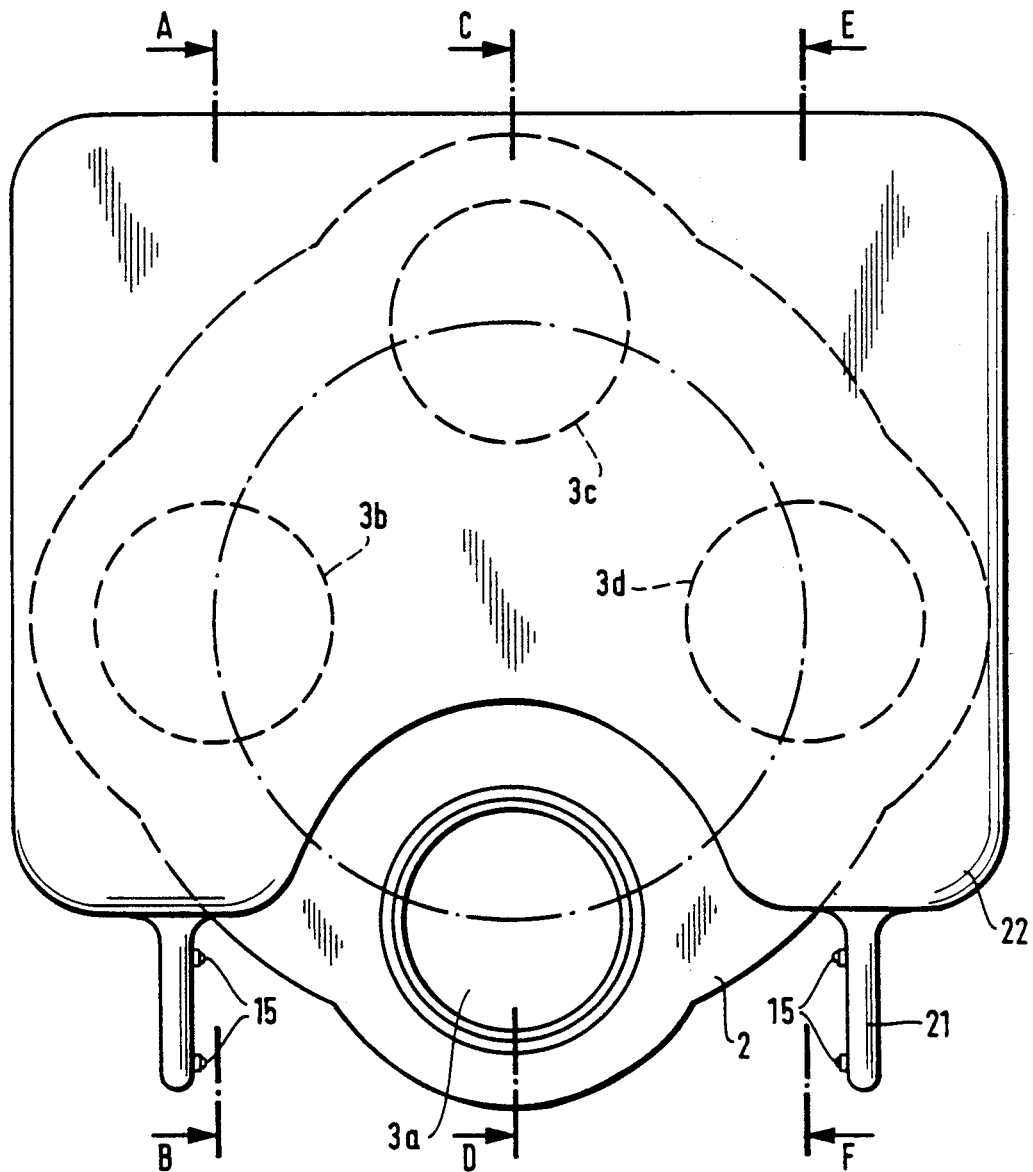
FIG. 2 is a top view of the waterless toilet of FIG. 1.

FIG. 2 illustrates a rotating seat 2 with four depressions 3 more or less covered up by a surface 22. The depressions are in four positions—a ready-to-use position 3a, a position 3b wherein the lids are dispensed, an extraction position 3c, and a position 3d wherein the containers are dispensed and inserted into the depressions. Surface 22 has a semicircular recess at the ready-to-use position and similar perforations at positions 3b, 3c, and 3d to allow the aforesaid functions.

Figure 3:
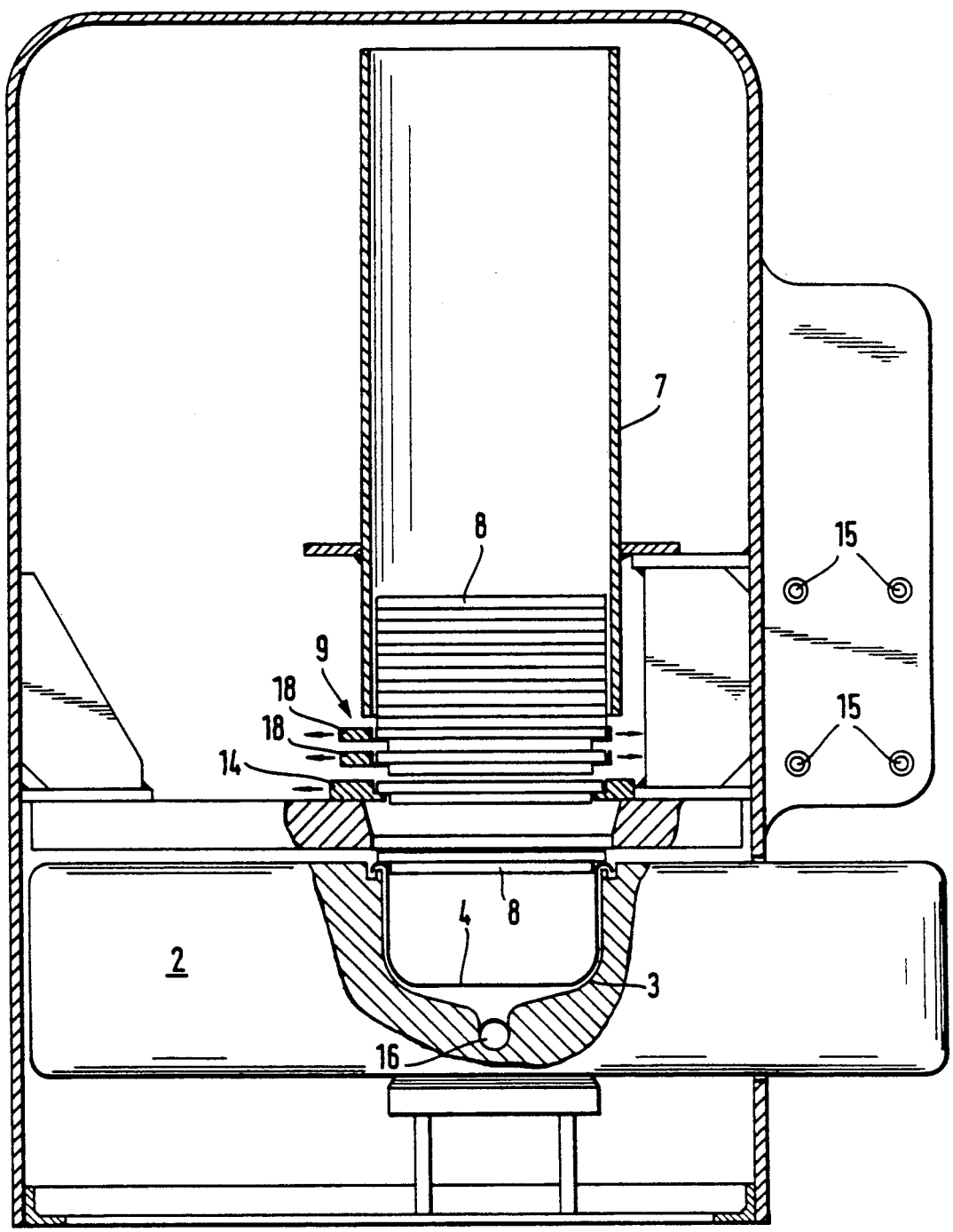
FIG. 3 is a cross-sectional view taken along the line A-B, rotated 90°, in FIG. 2.

FIG. 3 illustrates a magazine 7 that accommodates lids 8 and is provided with a mechanism 9 for dispensing lids one at a time. Mechanism 9 comprises a support 14 that supports the lowermost lid in its securing position. Support 14 driven by means well known in the art, travels out to release a lid. Additional traveling holders 18 ensure that only one lid at a time is released to close a container 4. Each depression 3 has a drain 16 at the bottom.

Figure 4:
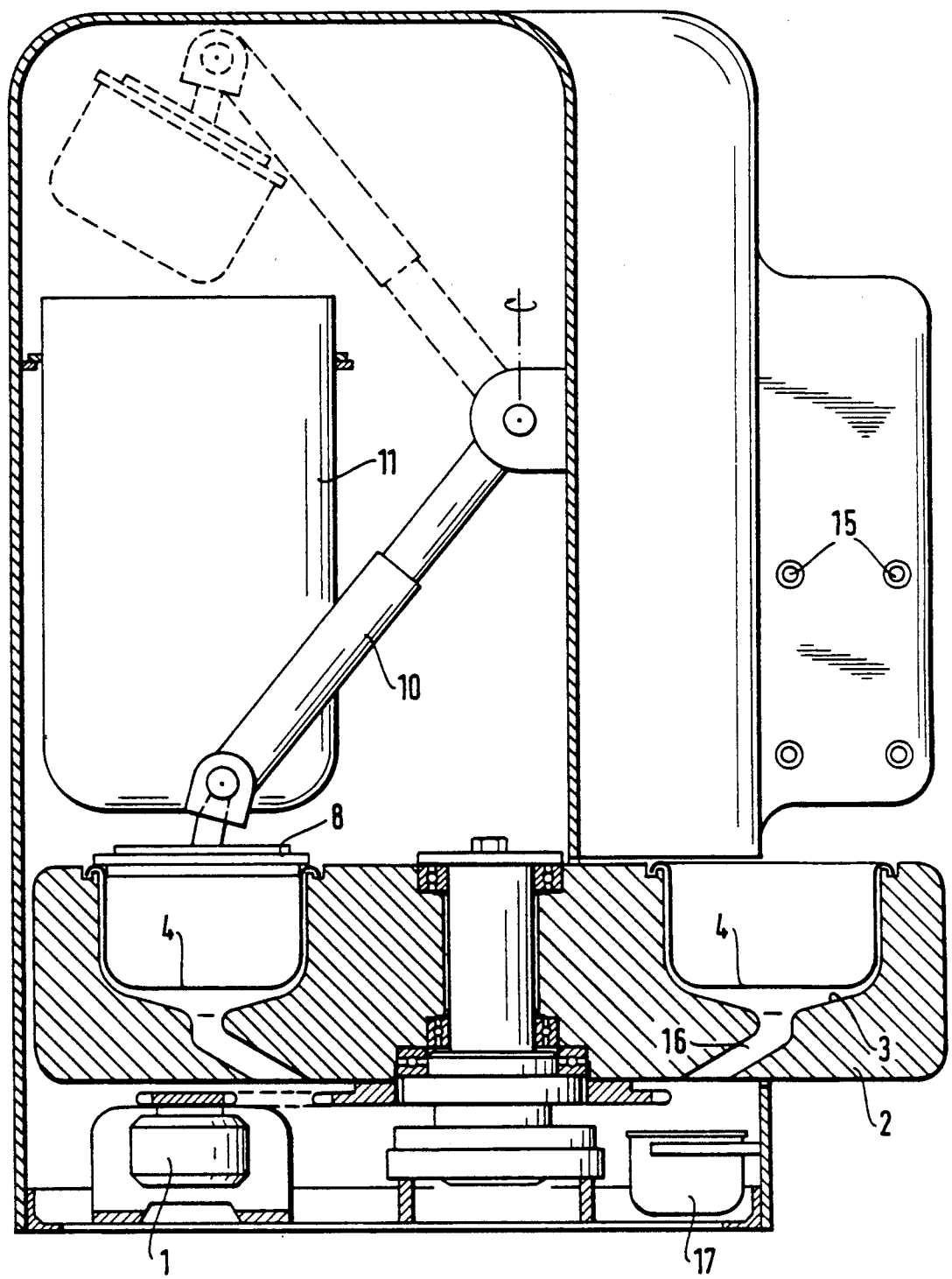
FIG. 4 is a cross-sectional view taken along the line C-D, rotated another 90°, in FIG. 2.
Figure 7:
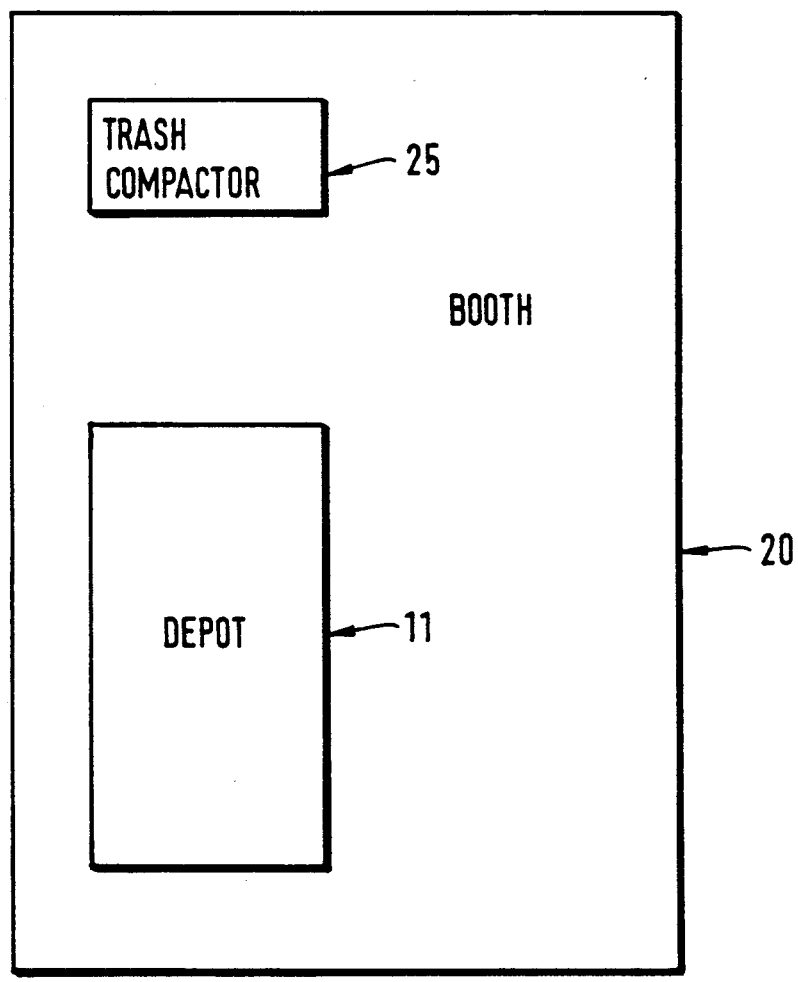
FIG. 7 is a schematic diagram showing the booth, depot and trash compact of the waterless toilet.

FIG. 4 illustrates the same seat 2 subsequent to rotation by a drive mechanism 1, an electric motor and transmission for example. A robotic arm 10 intercepts the container 4 closed by a lid 8 and forwards it to a depot 11. Drain 16, which is intended for emergencies, empties into a tank 17. The depot 11 is preferably provided with a mechanism 25 which compacts the material accumulated therein, in the manner of a trash compactor as schematically shown in FIG. 7.

Figure 5:
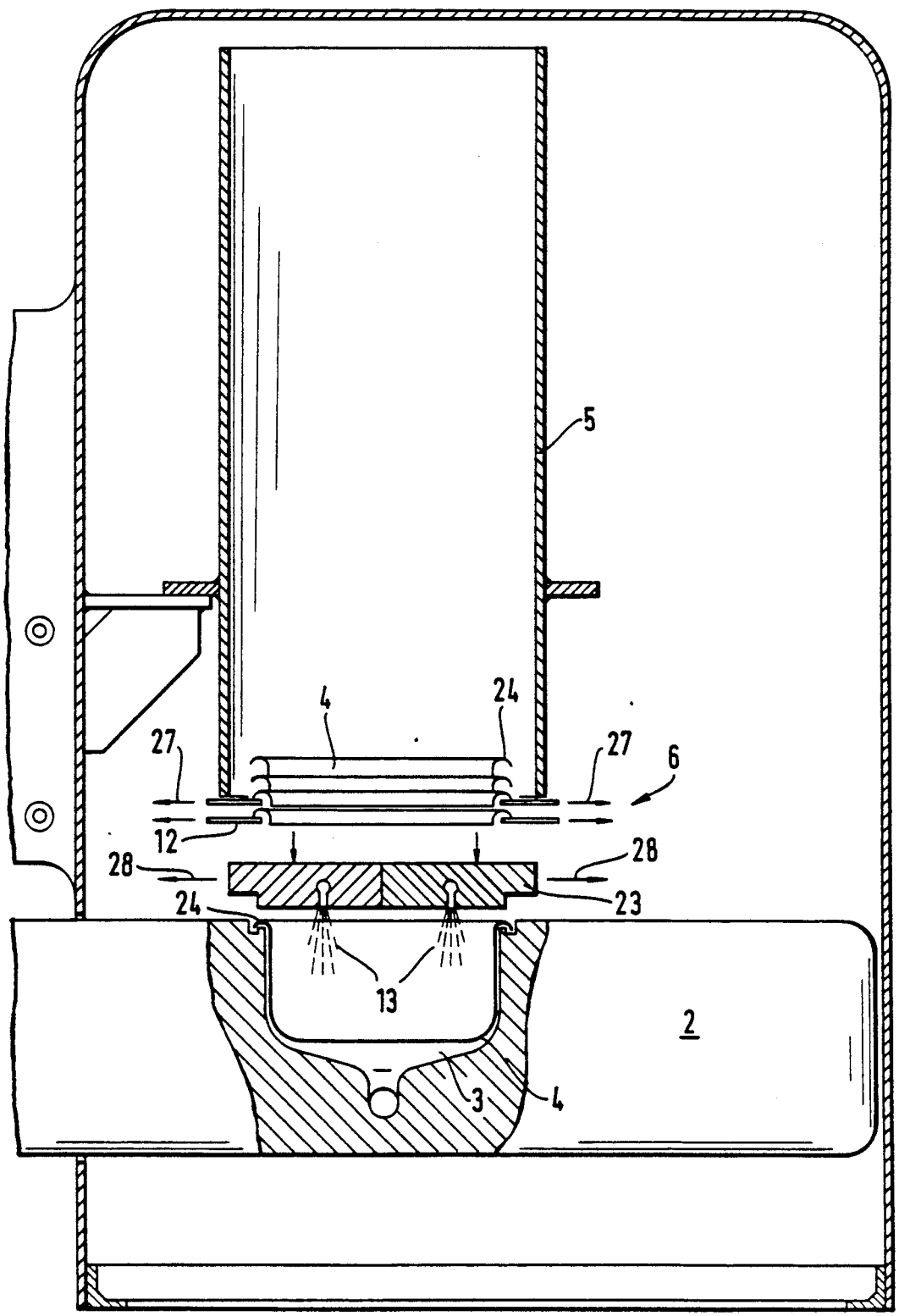
FIG. 5 is a cross-sectional view taken along the line E-F, rotated 90°, in FIG. 2.

FIG. 5 illustrates a magazine 5 that accommodates a supply of containers 4. The containers consist of plastic bags with a projecting edge in the form of a rigid collar that lie flat in the magazine. A mechanism 6 for dispensing one container at a time comprises supports 12 that engage below the edge 24 of the lowermost container. Supports 12 are moved apart by means well known in the art, in the directions indicated by the arrows 27. A plate 23 that travels in and out in pieces, as shown by arrows 28, accommodates a blower that inflates the container by airstreams 13 once it has been inserted.

Figure 6:
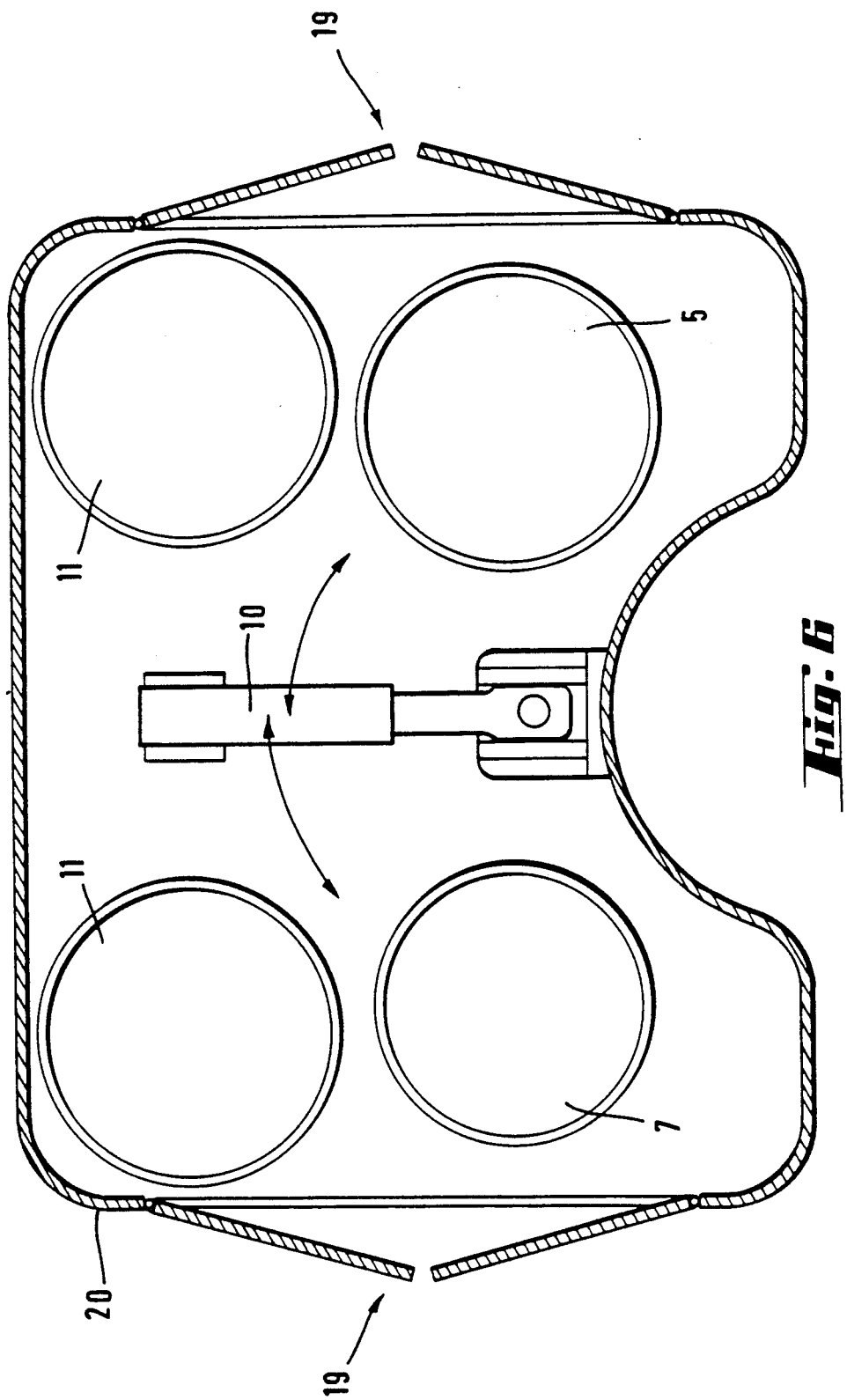
FIG. 6 is a cross-sectional view taken along the line G-H in FIG. 1.

FIG. 6 is a section illustrating the positions of magazines 5 and 7, robotic arm 10, and two depots 11. Booth 20 has doors 19 on the side that provide access for refilling the magazines and emptying the depots.

The operation of the waterless toilet will now be described.

When a user leaves a toilet, light sources and sensors 15, which interrupt light beams (not shown) as well known in the art initiate a 90° clockwise rotation of seat 2. The used container arrives in position 3b, illustrated in FIG. 2. A lid 8 is applied. Lids 8 are designed to feature the advantage of fitting tight around the containers' rigid edge. Means of forcing the lid down tight can be provided if necessary. That function can also be executed by robotic arm 10 before it extracts the container.

The rotation advances the already closed container into the position 3c illustrated in FIG. 2. The robotic arm 10 now comes into action and transfers the container to the depot 11. The rotation also advances an empty depression 3 into position 3d, wherein a fresh container 4 is inserted. The rotation also advances the depression with the fresh container 4 into the ready-to-use position 3a.

The waterless toilet ensures clean and hygienic operation with no need for the user to get his/her hands dirty removing a used container and inserting a fresh one. The automatic operation ensures that each user will encounter a ready-to-use toilet.

There has thus been shown and described a novel waterless toilet which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention, which is to be limited only by the claims which follow.

What is claimed is:

1. A waterless toilet for use with containers that accommodate the waste and can be sealed tight, comprising a seat having n depressions, each accommodating one container, whereby n is at least 4, and means for rotating the seat about a vertical axis in increments of $360/n°$ such that the depressions assume, in sequence, a plurality of positions as follows:
   a first position at which are disposed a magazine that accommodates a supply of unused containers and a mechanism for dispensing an individual container to each depression;
   a second position at which the toilet can be used;
   a third position at which are disposed a magazine that accommodates a supply of lids for sealing the used containers and a mechanism for dispensing an individual lids to each depression; and
   a fourth position at which are disposed means for removing a container from each depression once a lid has been placed over it and for forwarding the extracted container to a depot.

2. The waterless toilet defined in claim 1, wherein the mechanism that dispenses the individual containers includes means for supporting the lowest container in the magazine in a securing position, shifting it into a release position, releasing it, and traveling back into the securing position.

3. The waterless toilet defined in claim 1, further comprising blower means for inflating each container once it has been dispensed from the magazine.

4. The waterless toilet defined in claim 1, wherein the mechanism that releases the individual lids includes a support means for supporting the lowest lid in the magazine in a securing position, shifting it into a release position, releasing it, and traveling back into the securing position.

5. The waterless defined in claims 1, further comprising electric sensor means for automatically initiating a $360/n°$ rotation of the seat, the release of a fresh container and lid, and extraction of the used container once the user has finished.

6. The waterless toilet defined in claim 1, wherein the depressions each have a drain that opens into a tank when the toilet is in the ready-to-use position.

7. The waterless toilet defined in claim 1, further comprising a mechanism for compacting the material accumulated in the depot.

8. The waterless toilet defined in claim 1, wherein said removing means is a robotic arm.

* * * * *